United States Patent [19]

Fang

[11] 3,839,254

[45] Oct. 1, 1974

[54] AQUEOUS COATING COMPOSITION CONTAINING METALLIC PIGMENT COATED WITH IONIZABLE PERFLUOROALKYL SURFACTANT

[75] Inventor: James C. Fang, Media, Pa.

[73] Assignee: E. I. du Pont de Nemours and Company, Wilmington, Del.

[22] Filed: Sept. 1, 1972

[21] Appl. No.: 285,588

[52] U.S. Cl.... 260/29.6 MM, 106/308 Q, 106/308 S, 117/161 UZ, 117/161 UT, 117/161 UC, 260/29.4 UA, 260/29.6 M, 260/29.6 TA
[51] Int. Cl........................ C08f 45/02, C08f 37/00
[58] Field of Search............ 260/29.6 MM, 29.6 M; 106/308 Q, 308 S

[56] References Cited
UNITED STATES PATENTS

| | | | |
|---|---|---|---|
| 2,795,564 | 6/1957 | Conn et al. | 260/29.6 MM |
| 3,244,542 | 4/1966 | Brown et al. | 260/29.6 MM |
| 3,245,971 | 4/1966 | Iserson | 260/29.6 MM |

*Primary Examiner*—Wilbert J. Briggs

[57] ABSTRACT

The improved aqueous coating composition contains a uniformly dispersed film-forming carboxylic acid polymer that is at least partially neutralized with an organic basic compound and which contains 0.1–20 percent by weight of a uniformly dispersed metallic pigment that has a coating of an ionizable perfluoroalkyl surfactant which renders the pigment nonreactive with the aqueous coating composition.

The novel coating composition is particularly useful in coating automobile bodies and truck bodies and is stable even under elevated temperatures and does not have the problem of gas formation caused by the reaction of the metallic pigment.

6 Claims, No Drawings

AQUEOUS COATING COMPOSITION CONTAINING METALLIC PIGMENT COATED WITH IONIZABLE PERFLUOROALKYL SURFACTANT

BACKGROUND OF THE INVENTION

This invention is related to coating compositions and particularly to aqueous coating compositions containing a nonreactive metallic pigment.

Pollution problems caused by conventional paints which utilized solvents have caused the manufacturing industries such as the automobile and truck manufacturing industries to turn to water-based coating compositions that do not contain organic solvents or only very small amounts of organic solvents. To provide high quality finishes with an exceptional glamour appearance, metallic flake pigments have been utilized in conventional solvent based coating compositions. However, these untreated metallic flake pigments react with the aqueous coating composition and form hydrogen gas particularly at elevated temperatures which creates a safety hazard and these metallic flake pigments tend to settle and form a cake in the aqueous coating composition.

The improved coating composition of this invention utilizes a metallic flake pigment which has been treated with a perfluoroalkyl surfactant and the flake in these compositions does not react with the aqueous coating composition and settling of the flake is reduced.

SUMMARY OF THE INVENTION

An improved aqueous coating composition containing 5-60 percent by weight of a uniformly dispersed film-forming binder of a carboxylic polymer that is at least partially neutralized with an organic basic compound which contains as the improvement 0.1-20 percent by weight, based on the weight of the binder, of uniformly dispersed metallic pigments having a coating of an ionizable perfluoroalkyl surfactant which renders the pigment nonreactive with the aqueous coating composition.

The process for preparing the nonreactive metallic flake pigment is also part of this invention.

DESCRIPTION OF THE INVENTION

The novel coating composition of this invention is prepared by treating the metallic pigment with a perfluoroalkyl surfactant. In this process the metallic pigment is formed into an aqueous dispersion. This pigment dispersion is then blended with the aqueous coating composition. Preferably the resulting novel coating composition contains 0.1-20 percent by weight, based on the weight of the film forming binder, of the metallic flake pigment treated with the perfluoroalkyl surfactant.

The treatment perfluoroalkyl the metallic pigment is accomplished by blending the metallic pigment with an aqueous solution of the perfluoroalkyl surfactant. About 0.1-10 percent by weight, based on the weight of the metallic pigment, of the perfluoroalkyl surfactant is utilized. The perfluroalkyl surfactant preferably is dissolved in a water miscible solvent. It is important that the treatment of the flake is accomplished in an aqueous solution that does not contain chloride and sulfate ions.

Typical metallic pigments that can be utilized are aluminum flake pigment, zinc flake pigment, aluminum powder and zinc powder.

The perfluoroalkyl surfactants utilized in this invention contains a water solubilizing group, such as a -COOH group, and when the surfactant is ionized, an anion which contains the fluoroalkyl chain is formed. Preferably, the ionizable fluoroalkyl surfactant has the following formula

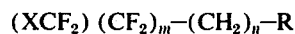

$(XCF_2)(CF_2)_m-(CH_2)_n-R$ in which $m$ is an integer from 1 to 10 and preferably 7 to 9, $n$ is from 0 to 4, X is from the group of fluorine and hydrogen, and R is an ionizable monovalent radical which contains either a carboxylic group, phosphoric group, or a sulfonic group. The ammonium, substituted ammonium, alkali metal salts of these compounds can also be used.

For example, the following fluoroalkyl surfactants are useful: pentadecafluorooctanoic acid, ammonion pentadecafluorooctanoate, dimethylammonium pentadecafluorooctanoate, sodium pentadecafluorooctanoate, heptadecafluorononylsulfonic acid, ammonium heptadecafluorononylsulfonate, dimethylammonium heptadecafluorononylsulfonate, sodium heptadecafluorononylsulfonate, pentafluoropropionic acid, ammonium pentafluoropropionate, tricosafluorolaurylphosphoric acid, ammonium tricosafluorolaurylphosphate, dimethylammonium tricosafluorolaurylphosphate, and sodium tricosafluorolaurylphosphate.

A particularly useful group of ionizable fluoroalkyl surfactants are fluoroalkylphosphoric compounds which are fully described in Benning U.S. Pat. No. 2,597,702 issued May 20, 1952, which is hereby incorporated by reference. Useful fluoroalkylphosphoric compounds have the formula

$[H(CF_2)_{2n}CH_2O]_x PO(OM)_y$ wherein $n$ is an integer from 1 to 5, x is an integer from 1 to 3, $y$ is 3-x, and M can be either hydrogen, alkali metal, ammonium, or substituted ammonium.

A wide variety of these fluoroalkylphosphoric compounds can be used, for example, mono, di, and trialkyl esters or the ammonium salts thereof; such esters are mono(tetrafluoropropyl)phosphate, di(tetrafluoropropyl)phosphate, di(octafluoroamyl)phosphate, tri(tetrafluoropropyl)phosphate, and tri(octafluoroamyl)photphate.

Particularly useful fluoroalkylphosphoric compounds are, for example, a mixture of phosphate esters of a $C_7$ to $C_9$ perfluorocarbon alcohol and phosphorus pentoxide; preferred is a mixture of mono(dodecafluoroheptyl)phosphate and hexadecafluorononyl phosphate.

Any of the conventional aqueous coating compositions which contain 5-50 percent by weight of a uniformly dispersed film-forming binder of a carboxylic acid polymer can be utilized in this invention. These compositions generally are at least partially neutralized with an organic basic compound such as ammonium hydroxide, ethanolamine, dialkylethanolamine and other amines, diamines, triamines, and the like.

These compositions can be acrylic coating compositions containing alkylmethacrylates, alkylacrylates, acrylonitrile, acrylamides, hydroxyalkylacrylates, hydroxyalkylmethacrylates, and $\alpha,\beta$-ethylenically unsaturated carboxylic acid. Typical alkylmethacrylates that can be used are: methylmethacrylate, ethylmethacrylate, propylmethacrylate, butylmethacrylate, pentylmethacrylate, hexylmethacrylate, 2-ethylhexylmethacrylate, nonylmethacrylate, decylmethacrylate, laurylmethacrylate and the like. Typical alkylacrylates are ethylacrylate, propylacrylate, butylacrylate, hexylacrylate, 2-ethylhexylacrylate, nonylacrylate, decylacrylate, laurylacrylate, and the like. Typical hydroxyalkylacrylates and methacrylates contain 2–4 carbon atoms in the alkyl group and are for example, hydroxyethylacrylate, hydroxypropylacrylate, hydroxybutylacrylate, hydroxyethylmethacrylate, hydroxypropylmethacrylate, hydroxybutylmethacrylate. Typical $\alpha,\beta$-ethylenically unsaturated carboxylic acids are: acrylic acid, methacrylic acid, itaconic acid, crotonic acid, and the like.

The following polymer provides a coating composition with excellent physical properties:

35–65 percent by weight, based on the weight of the polymer, of styrene or an alkyl methacrylate, having 1–4 carbon atoms in the alkyl group or a mixture of styrene and an alkyl methacrylate, 29–53 percent by weight, based on the weight of the polymer, of an alkyl acrylate having 2–8 carbon atoms in the alkyl group, 3–6 percent by weight, based on the weight of the polymer, of acrylamide, 3–6 percent by weight, based on the weight of the polymer, of itaconic acid;

wherein the polymer has a relative viscosity of 1.10–150 and is neutralized with a volatile base to provide a pH to the coating composition of about 7.5–9.

Water soluble cross-linking agents can be added to the coating composition to form an enamel coating. These compositions contain 70–95 percent by weight of the above-described polymer and correspondingly, 5–30 percent by weight of the water soluble cross-linking as the film-forming constituents. In general, alkylated melamine formaldehyde resins or partially alkylated melamine formaldehyde resins that are water-soluble can be used. In particular, the methylolated melamine formaldehyde resins are useful such as, hexamethoxy methylol melamine. Other water-soluble cross-linking agents such as tetra-(ethoxymethyl)-bis-methoxy methyl melamine, water-soluble urea formaldehyde and dimethylol urea formaldehyde can also be used.

Another coating composition that can be used in this invention is an aqueous thermosetting acrylic enamel comprising 10–60 percent by weight of film-forming constituents and correspondingly 90–50 percent by weight of water and up to 20 percent by weight of a solvent for the film-forming constituents; wherein the film-forming constituents consist essentially of 1. 60–90 percent by weight, based on the weight of the film-forming constituents, of an acrylic polymer which consists essentially of
   a. 20–60 percent by weight, based on the weight of the acrylic polymer, of a hard constituent which is either methyl methacrylate, or a blend of methyl methacrylate and styrene wherein the styrene comprises up to 40 percent by weight of the polymer;
   b. 20–40 percent by weight, based on the weight of the acrylic polymer, of a soft acrylic constituent that is either an alkyl acrylate having 2–12 carbon atoms in the alkyl group, an alkyl methacrylate having 4–12 carbon atoms in the alkyl group, or a mixture of the above acrylate and methacrylate;
   c. 4–20 percent by weight, based on the weight of the acrylic polymer, of a hydroxy-containing constituent which is either a hydroxyalkyl methacrylate or a hydroxyalkyl acrylate or a mixture thereof in which the alkyl groups have 2–4 carbon atoms,
   d. 4–20 percent by weight, based on the weight of the acrylic polymer, of $\alpha, \beta$-unsaturated carboxylic acid; and 2. 10–40 percent by weight, based on the weight of the film-forming constituent, of a water dispersible alkylated melamine formaldehyde resin having 1–4 carbon atoms in the alkyl group; and the composition is at least partially neutralized with a water-soluble amine and has a pH of about 6–9.

The polymers used in the above compositions are prepared by conventional polymerization techniques well known in the art.

Other polymers can be used as the film-forming binder such as copolymers of styrene/acrylic acid/'-'Cardura" esters, epoxy ester copolymers, alkyd resins, polyesters, polyurethanes, perfluorocarbon polymers, and the like.

The novel coating composition of this invention is applied according to conventional coating techniques in which the coating composition is sprayed, brush coated, flow-coated, dip coated and electro coated into the substrate. The substrate can be a primed metallic substrate, fiberglas enforced plastic, plastic such as styrene, copolymers of styrene, polypropylene, and the like. The novel coating composition of this invention preferably is baked at about 100°–200°C. for about 5–30 minutes.

In another technique which provides a high quality coating composition, any of the aforementioned carboxylic polymers can be used to provide a second coating over the metallic pigment which has been treated with the perfluoroalkyl surfactant. Any of the above carboxylic polymers having an acid number of 30–75 can be used. The carboxylic polymer is added and mixed with the dispersion of perfluoroalkyl treated metallic pigment to provide a second coating to the pigment which helps disperse the pigment and keep the metallic pigment non-reactive with water. Generally about 0.5:1 to about 4:1 (weight ratio) of carboxylic polymer to the treated metal pigment is added.

The following Examples illustrate the invention. All quantities are in a weight basis unless otherwise indicated.

EXAMPLE 1

A treated aluminum flake dispersion is prepared as follows:

| | Parts by Weight |
|---|---|
| Distilled water | 250.0 |
| Perfluoroalkyl surfactant (mixed phosphate ester of a 7 carbon atom per fluorocarbon alcohol and phosphorus pentoxide prepared according to examples 3 and 4 of U.S. Patent 2,597,702) | 3.4 |
| Aluminum flake pigment | 70.0 |
| TOTAL | 323.4 |

The fluoro alkyl surfactant is mixed with water in a vessel and then the pH of the solution is adjusted with ammonium hydroxide to a pH of 7. The aluminum flake pigment is then added with constant agitation and the constituents are mixed for about three hours to form a dispersion.

A paint composition is prepared as follows:

| | Parts by Weight |
|---|---|
| Aqueous polymer solution (30% polymer solids of methylmethacrylate/butylacrylate/acrylamide/ itaconic acid, at ratio 55/35/5/5) | 500.0 |
| Deionized water | 200.0 |
| Aluminum flake dispersion (prepared above) | 24.5 |
| Monastral green pigment paste | 3.0 |
| Ethylene glycol monobutyl ether | 7.0 |
| Deionized water | 70.0 |
| TOTAL | 804.5 |

The above constituents are mixed together in order indicated above and then the entire composition is mixed for about 3 hours to form an aqueous paint composition containing metallic flake pigments.

The paint composition is placed into a container and allowed to stand for six months at room temperature during which time no settling of the pigment occurs nor does a gas develop in the container. The composition does not generate a gas nor does the pigment settle during this period of time.

The paint composition is sprayed onto a phosphatized steel panel and baked for 30 minutes at 175°C. and an acceptable paint film is formed.

EXAMPLE 2

An aluminum flake dispersion is prepared as follows:

| | Parts by Weight |
|---|---|
| Distilled water | 250 |
| Ammonium salt of perfluoroalkylphosphate [ammonium salt of $(F_3C)(CF_2)_m—CH_2—OPO_3H_2$ where m is 8–10] | 10 |
| Aluminum flake pigment | 70 |
| TOTAL | 330 |

The above constituents were charged into a mixing vessel and then stirred for about 3 hours to form a uniform dispersion.

A paint composition is prepared as follows:

| | Parts By Weight |
|---|---|
| Aqueous polymeric dispersion (described in Example 1) | 500.0 |
| Deionized water | 200.0 |
| Aluminum flake dispersion (prepared above) | 24.5 |
| Monastral green pigment paste | 3.0 |
| Ethylene glycol monobutyl ether | 7.0 |
| Deionized water | 70.0 |
| TOTAL | 804.5 |

The above ingredients are thoroughly blended together to form a paint composition. The resulting paint composition is sprayed onto a steel panel having a phosphatized surface and then baked for 30 minutes at 175°C. The resulting paint film is acceptable.

The above paint composition is placed into a sealed container and is stored at room temperature for about six months. No gas developed in the container nor is settling of the aluminum flake pigment noted. The paint is still of high quality after storage.

EXAMPLE 3

The aluminum flake dispersion is formed as follows:

| | Parts by Weight |
|---|---|
| Distilled Water | 500.0 |
| Perfluoroalkyl surfactant (described in Example 1) | 6.8 |
| Aluminum flake | 140.0 |
| TOTAL | 646.8 |

The perfluoroalkyl phosphate surfactant is blended with the water and the pH of the solution is adjusted to about 7 with ammonium hydroxide and then the aluminum flake is added and the composition is thoroughly blended together to form a high uniform dispersion.

A paint composition is then prepared as follows:

| | Parts by Weight |
|---|---|
| Aqueous acrylic polymer solution (22% polymer solids of a polymer of methylmethacrylate/butylacrylate/ acrylamide/itaconic acid, weight ratio 65/28/2/5) | 2,275.00 |
| Aluminum flake dispersion (prepared above) | 72.00 |
| Monastral green pigment | 0.85 |
| Yellow pigment dispersion (40% Anthra pyrimidine pigment dispersed in a high boiling organic solvent) | 3.90 |
| Lamp black pigment | 1.00 |
| TOTAL | 2,352.75 |

The above ingredients are thoroughly blended together to form a paint composition having a 48 second viscosity measured in a number 2 Zahn cup at 25°C. The above paint composition is then sprayed on to an aluminum panel then baked for 10 minutes at 110°C and then baked for 15 minutes at about 162°C. An acceptable paint film is formed on the panel.

The above paint composition is placed in a sealed container and allowed to stand at room temperature for six months. There is no gas buildup on the container, nor was a settling of the pigment noted. The above paint composition is still a high quality paint after storage.

EXAMPLE 4

An aluminum flake dispersion is prepared as follows:

| | Parts by Weight |
|---|---|
| Portion 1 | |
| Distilled Water | 500.0 |

-Continued

| | Parts by Weight |
|---|---|
| Perfluoroalkyl surfactant (described in Example 2) | 10.2 |
| Portion 2 | |
| Aluminum Flake pigment | 210.0 |
| Portion 3 | |
| Aqueous Acrylic Polymer solution (described in Example 3) | 250.0 |
| TOTAL | 970.2 |

Portion 1 is premixed and then Portion 2 is added and mixed and Portion 3 is then added and the mixture is stirred for about three hours to form a uniform dispersion.

A paint is formulated as follows:

| | Parts by Weight |
|---|---|
| Aqueous Acrylic Polymer Solution (described above) | 4560.0 |
| Aluminum Flake Dispersion (prepared above) | 79.6 |
| Aqueous Violet Pigment Dispersion | |
| "Monastral" Blue Pigment Aqueous Dispersion | 38.7 |
| Carbon black aqueous dispersion | 1.4 |
| TOTAL | 4681.7 |

The above ingredients are stirred together for about one hour. The resulting paint is stable and Does not exhibit gassing and forms a high quality finish when applied to conventional substrates.

EXAMPLE 5

An aluminum flake dispersion is prepared as follows:

| | Parts by Weight |
|---|---|
| Portion 1 | |
| Anhydrous form of perfluoroalkyl phosphate (described in Example 2) | 4.0 |
| Isopropyl alcohol | 100.0 |
| Portion 2 | |
| Aluminum Flake | 80.0 |
| Portion 3 | |
| Hexamethoxymethylmelamine | 50.0 |
| TOTAL | 234.0 |

Portion 1 is premixed and then Portion 2 is added and mixed and Portion 3 is then added and the mixture is stirred for about three hours to form a dispersion.

A paint is then prepared by blending together the following ingredients:

| | Parts by Weight |
|---|---|
| Acrylic polymer solution (30% polymer solids of a polymer of methyl methacrylate/ butylacrylate methacrylamide/ itaconic acid weight ratio 40/50/5/5) | 100.0 |
| "Monastral Green" pigment dispersion | 2.0 |
| Carbon Black Dispersion | 1.0 |
| Aluminum Flake Dispersion | |

-Continued

| | Parts by Weight |
|---|---|
| (prepared above) | 10.0 |
| Deionized Water | 30.0 |
| TOTAL | 143.0 |

The above ingredients are stirred together for one hour. The resulting paint is stable and does not exhibit gassing and forms a high quality finish when applied to conventional substrates.

What is claimed is:

1. In an aqueous coating composition of 5-60 percent by weight of a uniformly dispersed film-forming binder of an acrylic carboxylic acid polymer at least partially neutralized with an organic basic compound, the improvement therewith comprising
0.1–20 percent by weight, based on the weight of the binder, of a uniformly dispersed aluminum flake pigment having a coating of an ionizable perfluoroalkyl surfactant which renders the pigment nonreactive with the aqueous coating composition;
the perfluoroalkyl surfactant is of the formula $$(xCF_2)(CF_2)_m - (CH_2)_n - R$$

wherein $m$ is an integer from 1 to 10, $n$ is an integer from 0–4, $x$ is hydrogen or fluorine and R is an ionizable radical containing a carboxyl group, a phosphoric radical or a sulfonic radical.

2. The coating composition of claim 1 in which $m$ is 7–9, $x$ is fluorine and R contains a carboxyl radical.

3. The coating compositions of claim 1 in which the perfluoroalkyl surfactant has the formula $$[H(CF_2)_{2n} CH_2O]_x PO(OM)_y$$

where $n$ is a positive integer of 1 to 5, $x$ is an integer of 1 to 3, $y$ is 3-x and M is hydrogen, an alkali metal, ammonium or substituted ammonium.

4. The coating composition of claim 1 in which the perfluoroalkyl surfactant is a mixed phosphate ester of a 7 to 9 carbon atom perfluorocarbon alcohol and phosphorus pentoxide.

5. The coating composition of claim 4 in which the carboxylic acid polymer is an acrylic polymer selected from the group consisting of A. an acrylic polymer consisting essentially of
35–65 percent by weight, based on the weight of the polymer, of styrene or an alkyl methacrylate, having 1–4 carbon atoms in the alkyl group or a mixture of styrene and an alkyl methacrylate,
29–53 percent by weight, based on the weight of the polymer, of an alkyl acrylate having 2–8 carbon atoms in the alkyl group,
3–6 percent by weight, based on the weight of the polymer, of acrylamide,
3–6 percent by weight, based on the weight of the polymer, of itaconic acid;
wherein the polymer has a relative viscosity of 1.10–1.50 and is neutralized with a volatile base to provide a pH to the coating composition of about 7.5–9 or B. an acrylic polymer consisting essentially of
20–60 percent by weight, based on the weight of the acrylic polymer, of a hard constituent which is either methyl methacrylate, or a blend of methyl methacrylate and styrene wherein the styrene comprises up to 40 percent by weight of the polymer;

20–40 percent by weight, based on the weight of the acrylic polymer, of a soft acrylic constituent that is either an alkyl acrylate having 2–12 carbon atoms in the alkyl group, an alkyl methacrylate having 4–12 carbon atoms in the alkyl group, or a mixture of the above acrylate and methacrylate;

4–20 percent by weight, based on the weight of the acrylic polymer, of a hydroxy-containing constituent which is either a hydroxyalkyl methacrylate or a hydroxyalkyl acrylate or a mixture thereof in which the alkyl groups have 2–4 carbon atoms, 4–20 percent by weight, based on the weight of the acrylic polymer, of $\alpha,\beta$-unsaturated carboxylic acid; and is at least partially neutralized with a water-soluble amine and has a pH of about 6–9.

6. The coating composition of claim 5 in which the aluminum flake pigment is coated with a second layer of a carboxylic polymer having an acid number of 30 to 75.

* * * * *